(12) United States Patent
Aguirre

(10) Patent No.: US 12,002,391 B2
(45) Date of Patent: Jun. 4, 2024

(54) MODULAR MULTI-SCREEN DISPLAY

(71) Applicant: Cesar Aguirre, Sinaloa (MX)

(72) Inventor: Cesar Aguirre, Sinaloa (MX)

( * ) Notice: Subject to any disclaimer, the term of this patent is extended or adjusted under 35 U.S.C. 154(b) by 111 days.

(21) Appl. No.: 17/526,200

(22) Filed: Nov. 15, 2021

(65) Prior Publication Data

US 2023/0061551 A1   Mar. 2, 2023
US 2024/0078937 A9   Mar. 7, 2024

(30) Foreign Application Priority Data

Sep. 2, 2021   (MX) .................. MX/u/2021/000490

(51) Int. Cl.
*G09F 9/302* (2006.01)
*G06F 3/14* (2006.01)
*G06F 3/147* (2006.01)

(52) U.S. Cl.
CPC .......... *G09F 9/3026* (2013.01); *G06F 3/1446* (2013.01); *G06F 3/147* (2013.01)

(58) Field of Classification Search
CPC ............... G09F 9/3026; G09F 13/0468; G09F 13/0481; G09F 15/0068; G09F 19/18; G09F 27/00; G06F 3/1446; G06F 3/147; G09G 2300/026; G09G 3/32
See application file for complete search history.

(56) References Cited

U.S. PATENT DOCUMENTS

| 1,625,299 | A | 4/1927 | Costello |
| 6,060,993 | A | 5/2000 | Cohen |
| 9,032,317 | B2 | 5/2015 | Santoro et al. |
| 9,940,086 | B2* | 4/2018 | Yoshizumi ........ H01L 27/14681 |
| 10,198,235 | B2* | 2/2019 | Yoshizumi ............ G06F 3/1446 |
| 10,572,211 | B2* | 2/2020 | Yoshizumi ............ G06F 3/1446 |
| 11,093,204 | B2* | 8/2021 | Yoshizumi ............ G06F 3/1446 |
| 11,567,724 | B2* | 1/2023 | Yoshizumi ........... H10K 77/111 |
| 2001/0052841 | A1 | 12/2001 | Polyakov |
| 2012/0229640 | A1 | 9/2012 | Rubio |

(Continued)

FOREIGN PATENT DOCUMENTS

| EP | 1293956 | 3/2003 |
| ES | 2264945 | 2/2007 |

(Continued)

*Primary Examiner* — Dmitriy Bolotin
(74) *Attorney, Agent, or Firm* — Defillo & Associates, Inc.; Evelyn A. Defillo

(57) ABSTRACT

The present invention is referred to a modular multi-screen display, which allows to display advertising by any of its parts including walls, upper crosspieces, interior or exterior, that includes a chassis on which it is mounted the screens but that are synchronized between them to show one image unit in all the display body, in such a manner that the synchronization of them and the change of dynamic advertising posters that are displayed are manipulated using a modem that is connected in real time to a physical or virtual server that is located in a remote physical unit and that through this it is carried out the change of the advertising presentation on the display, regardless of whether it is inside or outside of a business. Its variant includes a set of interconnected screens either on the business furniture, on household appliances or where appropriate on the roof of the business from outside the premises.

4 Claims, 13 Drawing Sheets

(56) References Cited

U.S. PATENT DOCUMENTS

| | | | | |
|---|---|---|---|---|
| 2014/0153241 A1* | 6/2014 | Templeton | ............ | G09F 27/008 |
| | | | | 362/249.02 |
| 2014/0259634 A1* | 9/2014 | Cox | ...................... | G06F 3/1446 |
| | | | | 29/729 |
| 2014/0267896 A1* | 9/2014 | Cox | ......................... | H04N 5/63 |
| | | | | 348/383 |
| 2014/0268562 A1* | 9/2014 | Cox | ......................... | G09F 15/00 |
| | | | | 361/679.01 |
| 2014/0268565 A1* | 9/2014 | Cox | ...................... | G09F 9/3026 |
| | | | | 361/730 |
| 2016/0132283 A1* | 5/2016 | Hall | ......................... | G06T 1/60 |
| | | | | 361/730 |
| 2016/0210103 A1* | 7/2016 | Yoshizumi | ............ | H10K 77/111 |
| 2018/0217800 A1* | 8/2018 | Yoshizumi | .............. | G06F 3/147 |
| 2019/0163433 A1* | 5/2019 | Yoshizumi | ............ | H10K 77/111 |
| 2019/0171403 A1* | 6/2019 | Hall | ....................... | H01H 11/04 |
| 2020/0034105 A1* | 1/2020 | Yoshizumi | ............ | H10K 77/111 |
| 2020/0327851 A1* | 10/2020 | Seo | .......................... | G09G 3/32 |
| 2021/0071417 A1* | 3/2021 | Deleu | ................... | H05K 5/0017 |
| 2021/0166619 A1* | 6/2021 | Kim | ....................... | G09G 3/2088 |
| 2021/0373838 A1* | 12/2021 | Kim | ....................... | G06F 3/1446 |
| 2021/0373839 A1* | 12/2021 | Yoshizumi | ............ | G06F 3/1446 |
| 2023/0061551 A1* | 3/2023 | Aguirre | ............... | G09F 13/0468 |

FOREIGN PATENT DOCUMENTS

| | | |
|---|---|---|
| ES | 2345881 | 10/2010 |
| WO | WO2015020513 | 2/2015 |

* cited by examiner

MODULAR MULTI-SCREEN DISPLAY

FIELD OF INVENTION

The present invention is referred to a modular multi-screen display, which allows to display advertising on any of its parts including walls, upper, interior and exterior crosspieces, which comprises of a chassis on which the screens are mounted but which are synchronized with each other to show an image unit throughout the body of the display in such a way that the synchronization of them and the change of the dynamic advertising posters that are presented are manipulated using a modem that is connected in real time to a physical or virtual server that is located in a remote physical unit and that through this it is carried out the change of the advertising presentation on the display, regardless of whether it is inside or outside of a business; due to its structures, it is considered to be a mechanical invention.

BACKGROUND

The exchange of publicity in the displays of a business represents one of the activities that requires the greatest economic resources for an entrepreneur. To keep the advertising up-to-date in a globalized world represents a challenge for entrepreneurs who are constantly dependent on product promotions of the products displaying in their business; in addition to this, the dynamic avalanche of promotions, new, diverse and globalized products generates large economic investments in advertising posters, shelves and in general in advertising.

The change of advertising also manages to generate large amounts of waste such as cardboard, paper, plastic that constantly generates garbage since they are not recyclable at least until after having undergone a transformation that allows them to reuse the posters that due to their temporality, products out of market or use, fashions, trends etc., simply become garbage and a high index of environmental pollution.

Some technologies that have been developed in the world to try to make the posters reusable, have focused on making fold-out furniture with interchangeable posters such as the patent EP1293956A2, called display with interchangeable posters that comprises a changeable poster display with at least one poster exchanger; each poster exchanger of the changeable poster display has a first shaft on which poster can be rolled and from which the posters can be unrolled up, a second poster shaft from which poster can be unrolled and rolled up, a first motor (1) by means of which the first shaft of the poster can be driven in the rolling and unrolling up direction, and a second motor (2) by means of which it is possible to drive the second poster shaft in the rolling and unrolling direction. To reliably control at least one poster exchanger of the interchangeable poster display in the most economical way possible for a predefinable display of posters, the interchangeable poster display has a controls set (3) for each poster exchanger, by means of which the first motor (1) and the second motor (2) can be controlled through an exit stage (18) and an electronic element of reversal of the direction of rotation (19), and a DIP switch (21) by means of which it is possible to set the display duration of each poster, a door contact by means of which the control set can be taken out of service (3) when the interchangeable posters display is open, and a non-contact sensor (13) though which the position of the posters can be verified.

The use of this technology is limited by at least the motors, the roller posters and particularly due to the size of the advertising displayed on the posters and also that the motors only print the force to change thanks to the twist they cause between the two posters in a reel.

Among other technologies developed in the world we can find the patent WO2015020513A1, called advertising display device with digital screens for motor vehicles, which is mounted on vehicles to allow an intelligent control and management of the advertising that is transmitted either directly or remotely. The advertising display device of the present invention comprises of main body or casing that includes three information display modules, that is to say, a central module and two side ones, to form and arrangement in the shape of the letter "T" from top view; a support base and an intelligent system of management of information.

Another invention related to this kind of inventions are the patents ES2264945T, US 2001052841, U.S. Pat. No. 6,060,993 A and US 2012229640 A1 where all of them show advertising variants on moving vehicles, which generally are mounted on the roof of the vehicle, but due to its structure, it may represent an important background to the invention proposed in this document.

Finally, other inventions that have been disclosed in the world are related to the electronic labels in the supermarkets such as patents ES2345881T3 connected with changing labels from a source of electronic manipulation or the U.S. Pat. No. 9,032,317B2 comprises of a system and method for the simultaneous visualization of multiple sources of information that includes a computerized method of presenting information from a variety of sources in a visualization device. Specifically, the present invention describes a graphical user interface to organize the simultaneous display of information from a multitude of information sources. Particularly, the present invention includes a user graphical interface to organize the content of a variety of information sources in a mosaic grid, each of which can update its content independently of the others. The function of the grid manages the updating frequencies of the multiple information sources. The present invention is intended to work independently of the platform.

Being this the invention that is completely related to the display of the present document, therefore in its previous art it is distinguished the following inventions related to this document: U.S. Pat. No. 1,625,299P, U.S. Ser. Nos. 09/702,325, 10/136,873, 11/140,546, 12/124,125, 13/163,257 and 13/759,942, which are associated with the first one.

One of the main differences presented by this invention is the screen arrangement on a front axis, although the work to present on side and rear shafts is obvious, we can state at all times that the corners are an unsolved problem, nor screen that are in circular arrangement to make a display of the information in 360-degree arrangements, or well curved displays on the edges that could represent the prismatic arrangement of the screens.

DESCRIPTION

The characteristic details of the present modular multi-screen display are clearly set forth in the following description and in the accompanying figures, where the same reference marks are followed to indicate the parts and figures shown.

Figure 1:
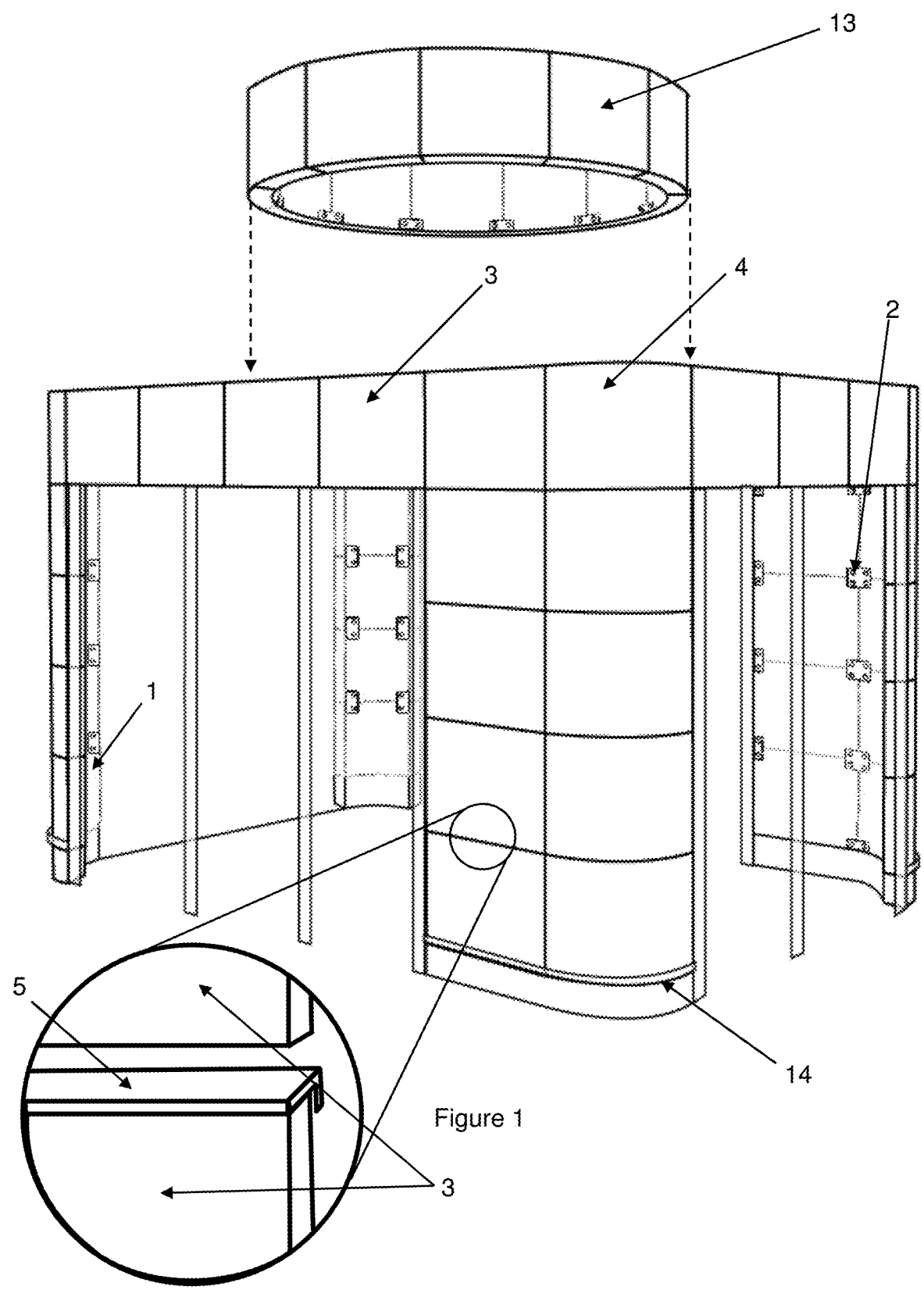
FIG. 1 shows a conventional perspective view of the modular multi-screen display, with the upper cylindrical screen section separated from the main cabinet with fisheye approach to indicate the support where each screen rests to prove stability to the invention.
Figure 2:
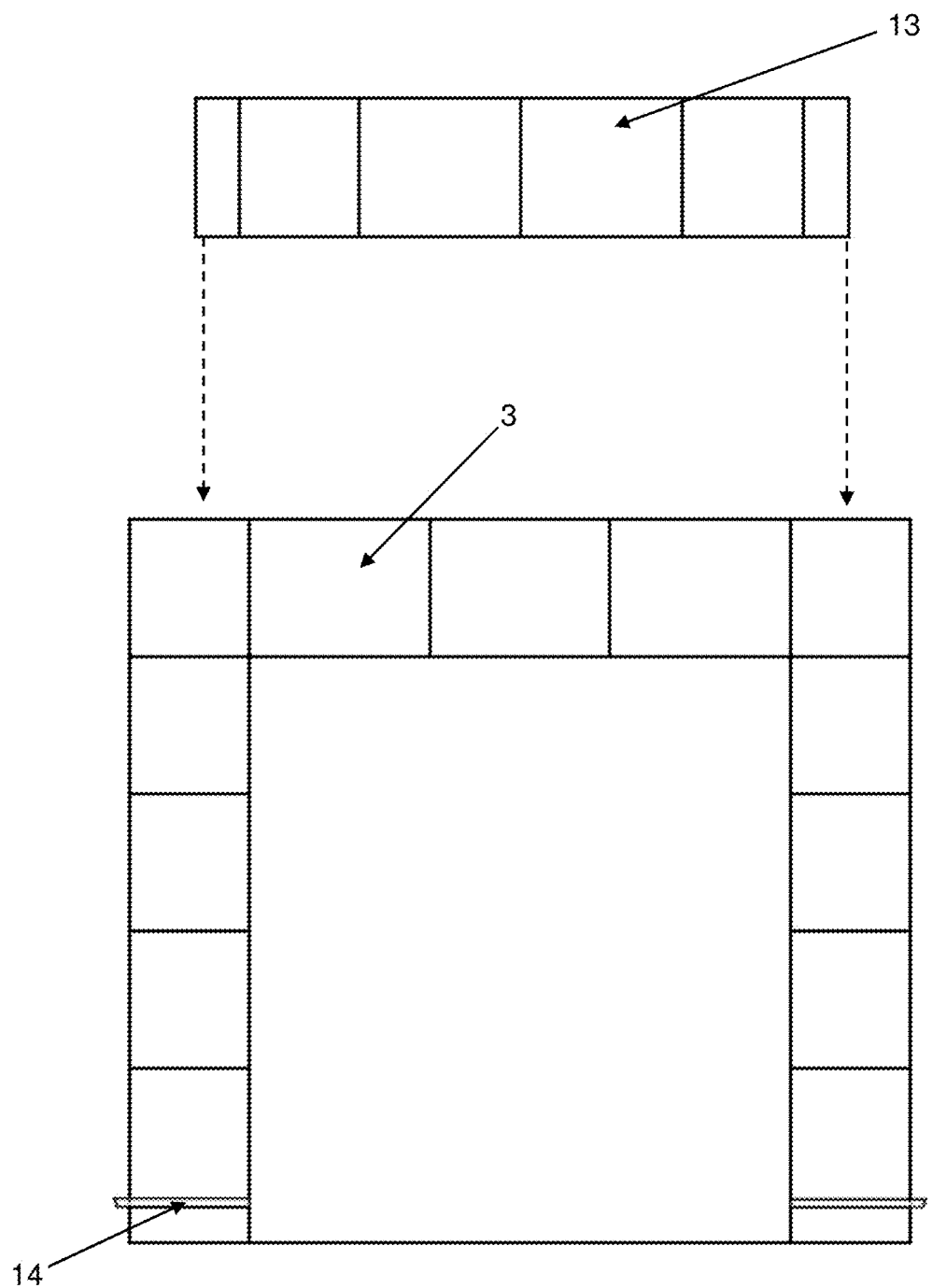
FIG. 2 shows a front view of the modular multi-screen display with the upper cylindrical section of screens separated from the main cabinet.
Figure 3:
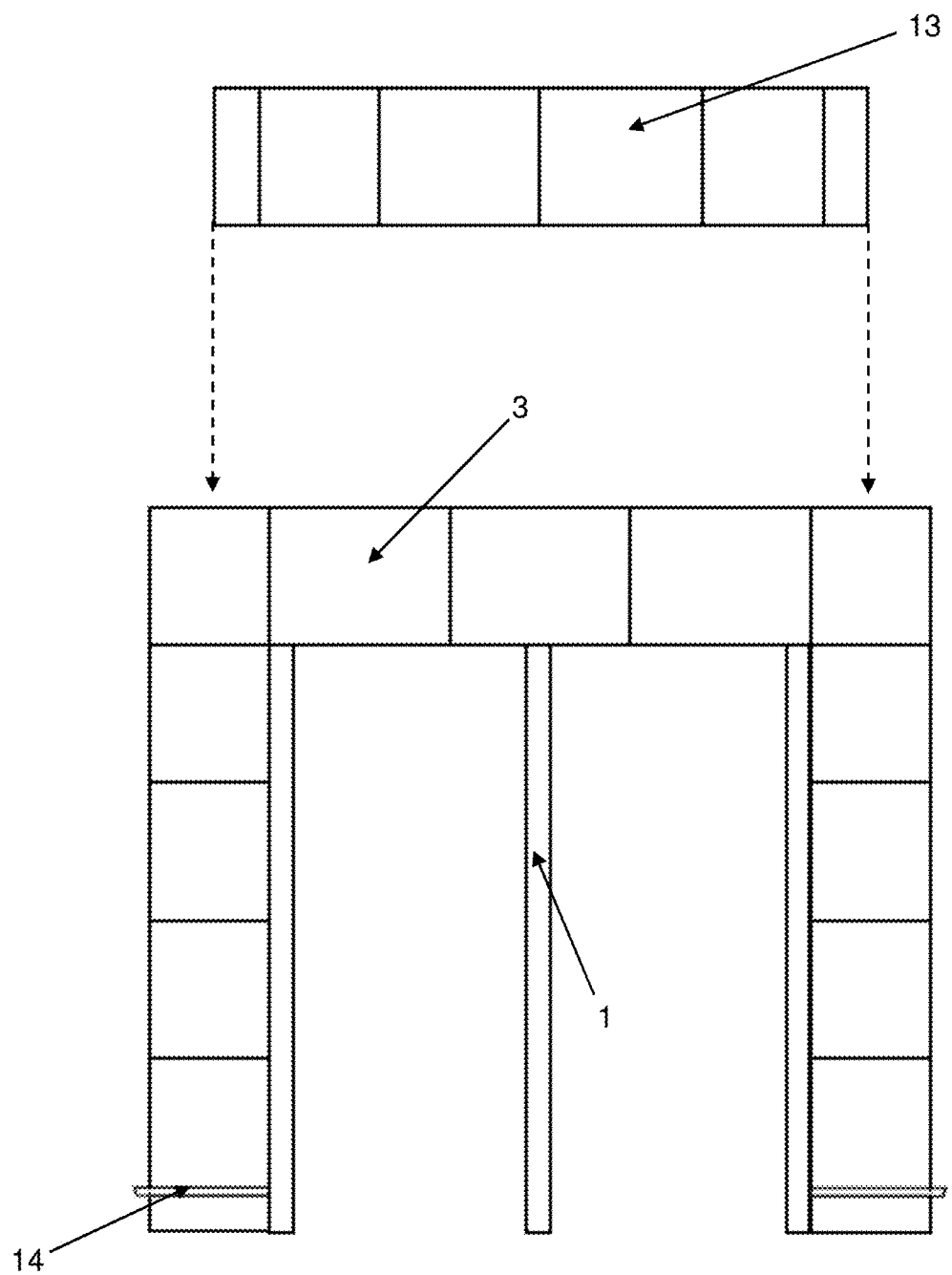
FIG. 3 shows a rear view of the modular multi-screen display, with the upper cylindrical section of screens separated from the main cabinet.
Figure 4:
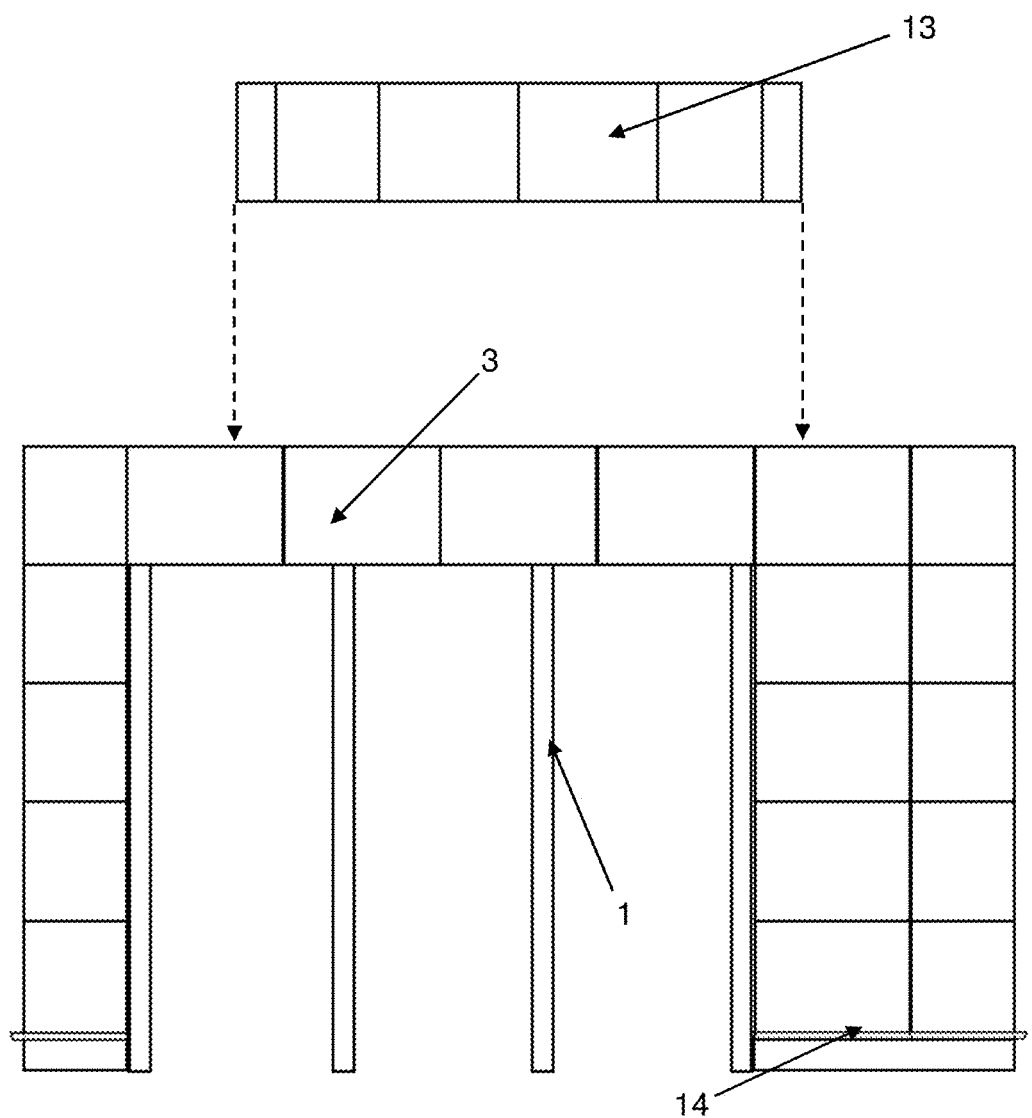
FIG. 4 shows a side view of the modular multi-screen display. Being the other side view substantially the same with the upper cylindrical section of the screens separated from the main cabinet.
Figure 5:
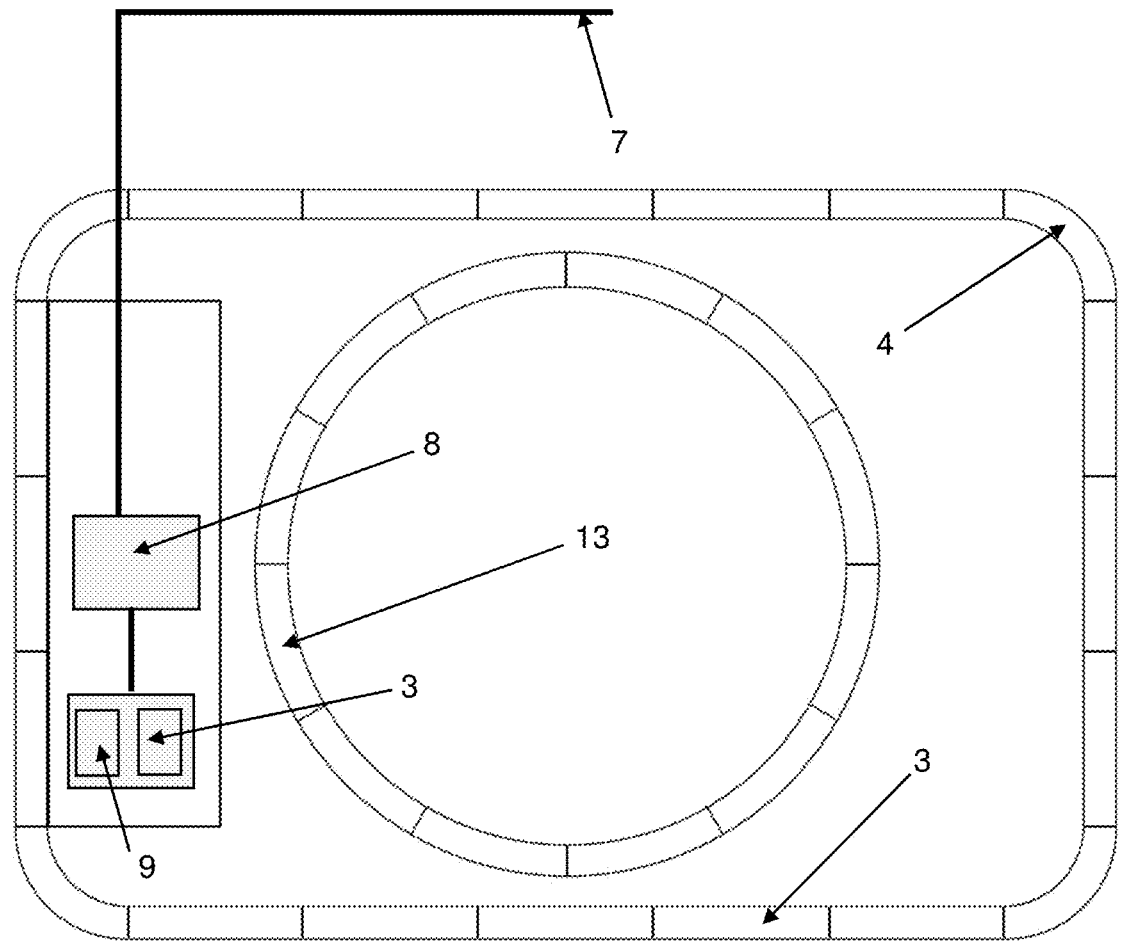
FIG. 5 shows an upper view of the modular multi-screen display.
Figure 6:
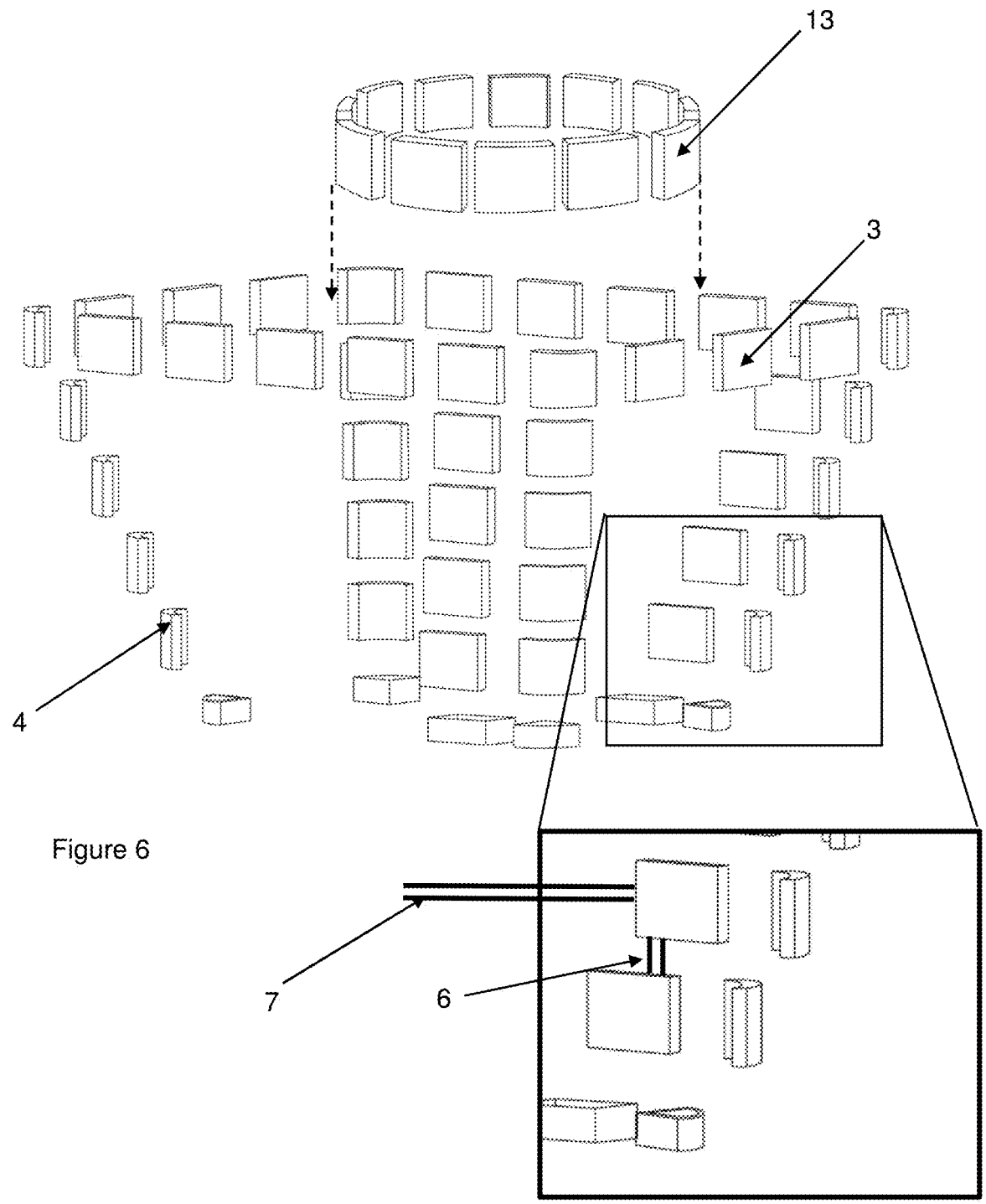
FIG. 6 shows a conventional perspective exploded view of the screens that form the display unit separated from the cabinet. With a fisheye zoom to indicate the connection between screens and the power cables.
Figure 7:
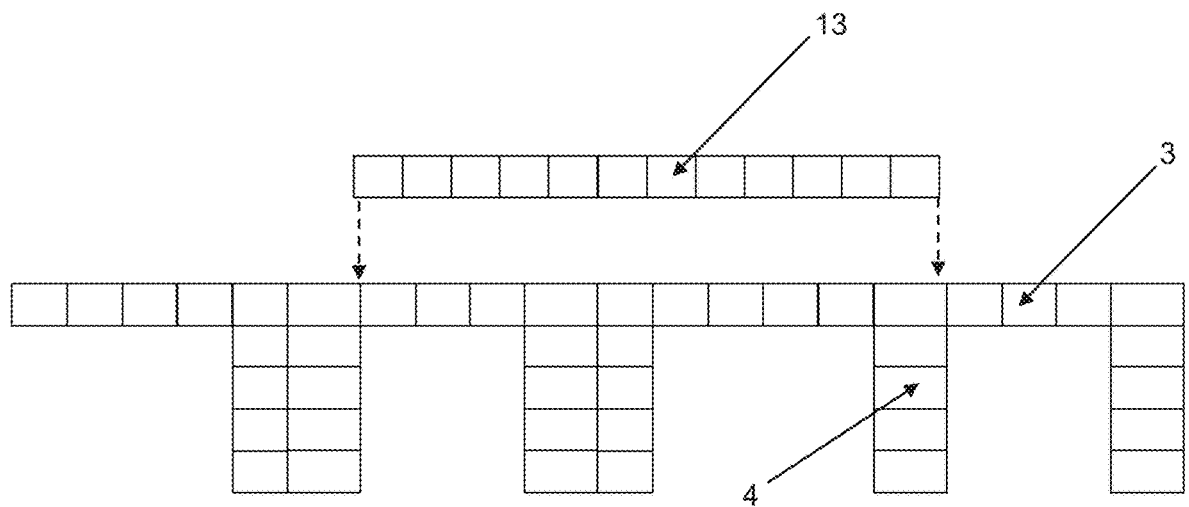
FIG. 7 shows an extended side view of the modular multi-screen display, with the upper cylindrical section of screens separated from the main cabinet.
Figure 8:
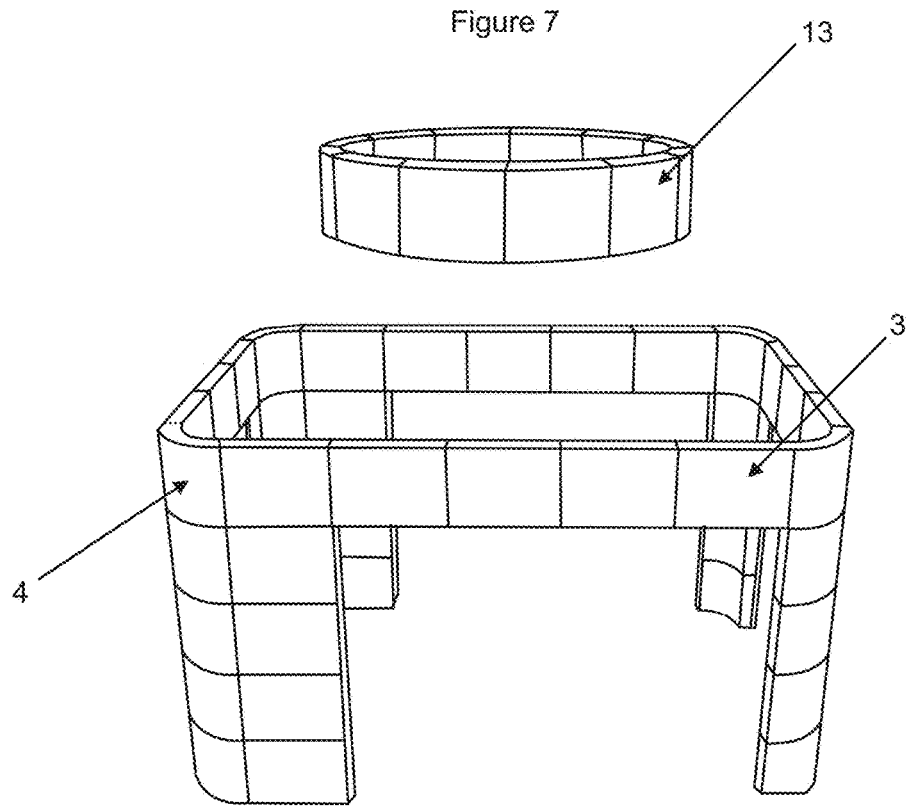
FIG. 8 shows an exploded upper front view in perspective of the screens that are placed on the edges, the conventional walls of the chassis and the upper cylindrical section of the modular multi-screen display. Being the other rear view substantially the same.
Figure 9:
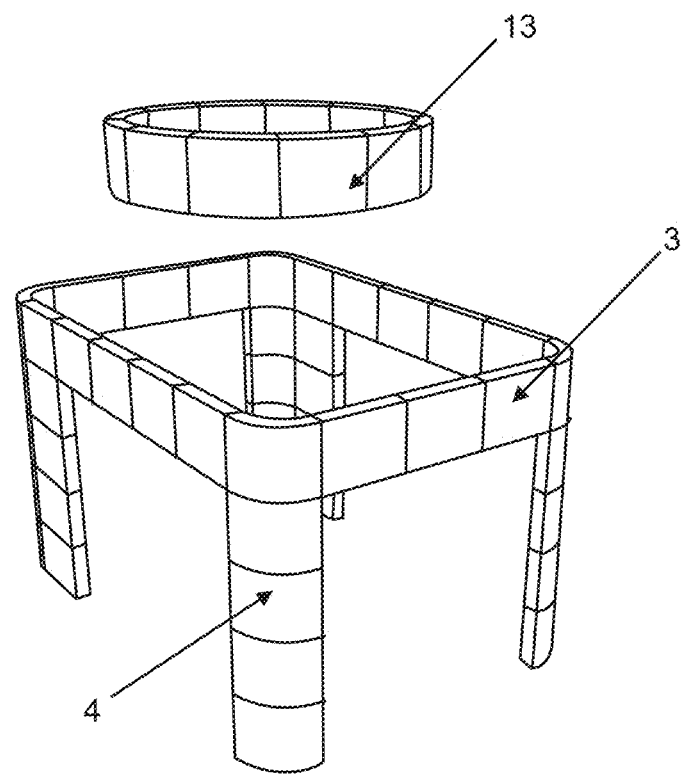
FIG. 9 shows an exploded upper front view in perspective of the screens that are placed on the edges, the conventional walls of the chassis and the upper cylindrical section of the modular multi-screen display. Being the other side view substantially the same.
Figure 10:
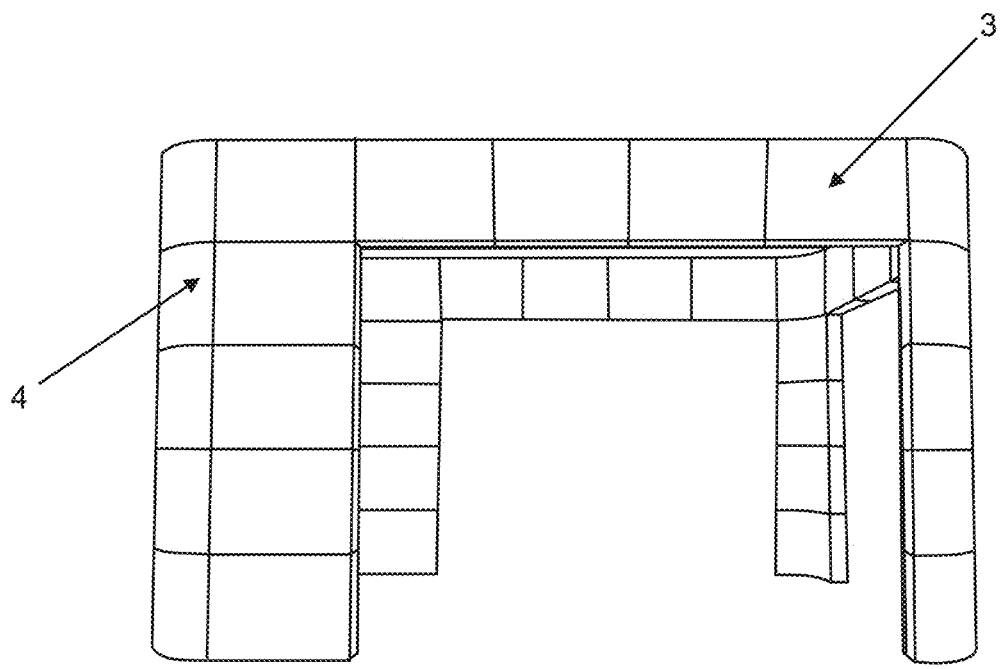
FIG. 10 shows a front view of the screen that are placed on the edges, the conventional walls of chassis without the upper cylindrical section of the modular multi-screen display. Being the rear view substantially the same.
Figure 11:
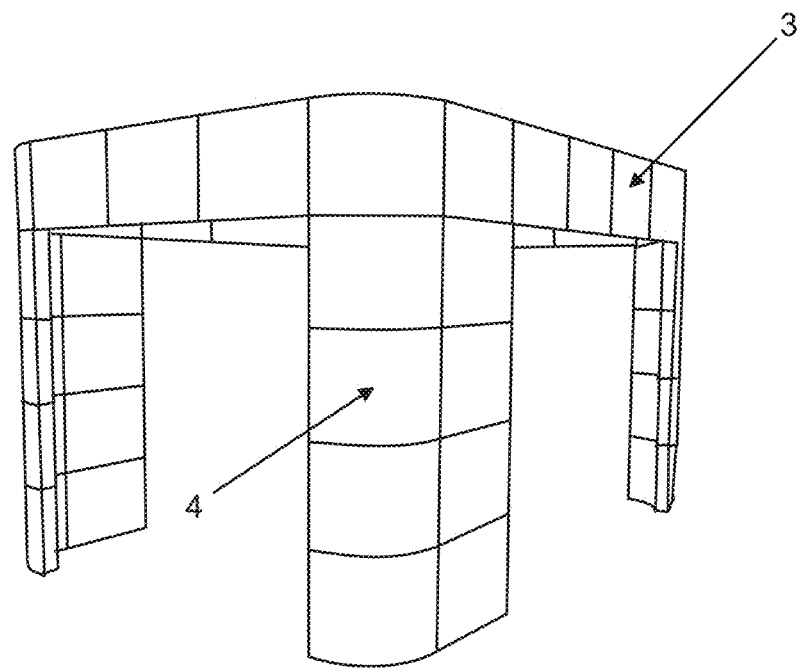
FIG. 11 shows a side cornered view in perspective of the screens that are placed on the edges, conventional walls of the chassis without the upper cylindrical section of the modular multi-screen display.
Figure 12:
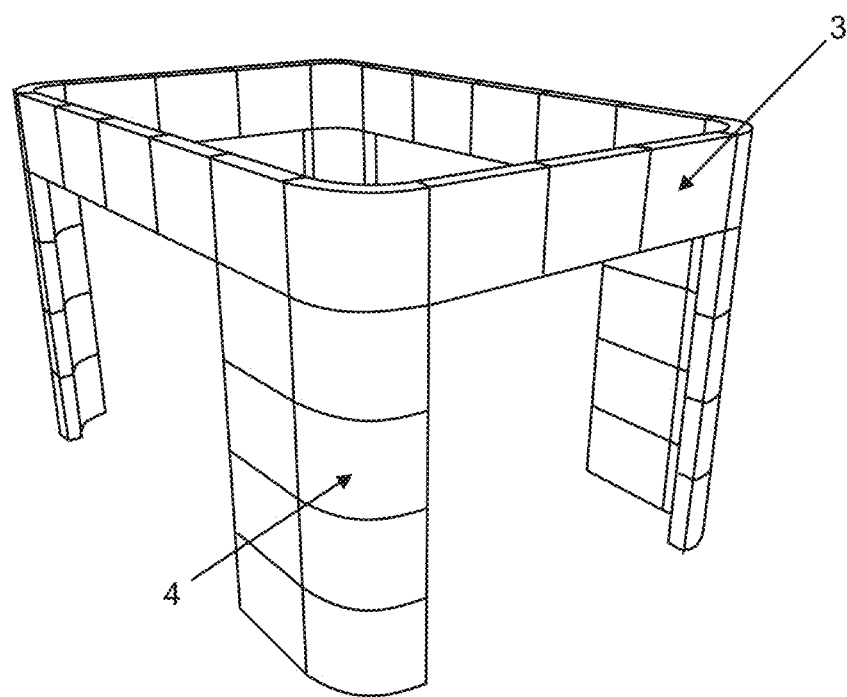
FIG. 12 shows an upper cornered view in perspective of the screens that are placed on the edges, the conventional walls of chassis without the upper cylindrical section of the modular multi-screen display.
Figure 13:
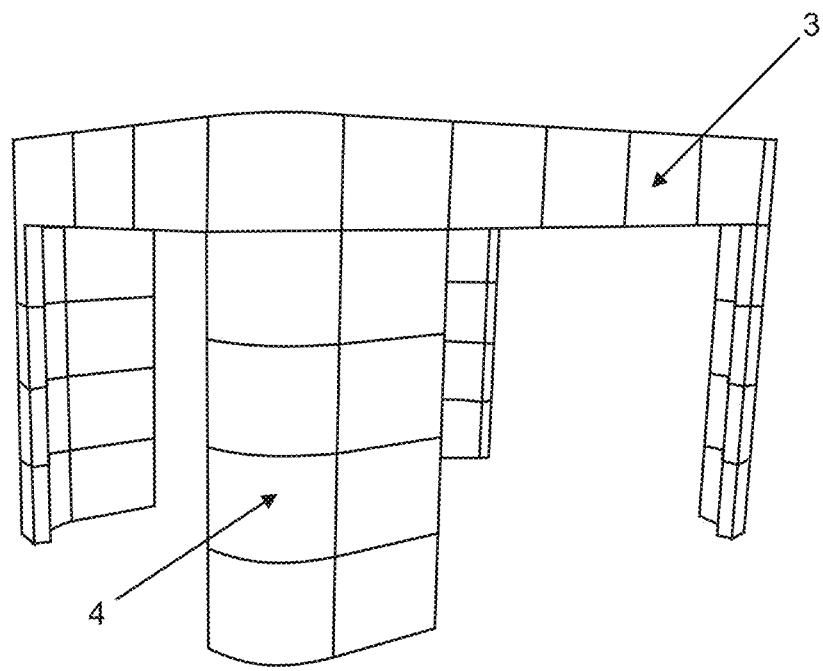
FIG. 13 shows a front cornered view in perspective of the screens that are placed on the edges, the conventional walls of chassis without the upper cylindrical section of the modular multi-screen display.
Figure 14:
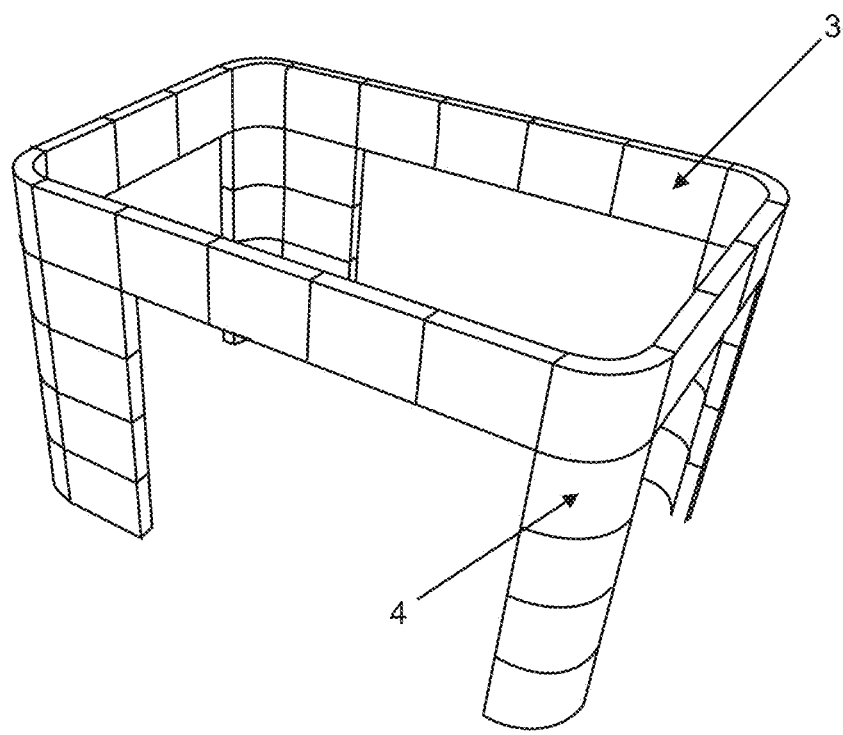
FIG. 14 shows an upper front cornered view in perspective of the screens placed on the edges, the conventional walls of chassis without the upper cylindrical section of the modular multi-screen display.
Figure 15:
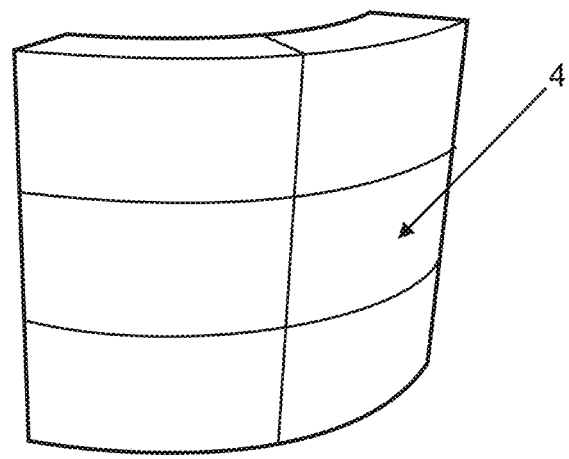
FIG. 15 shows a conventional view in perspective of an arrangement of curved screens that are placed on the edges to appreciate their coupling rear characteristics of the modular multi-screen display.
Figure 16:
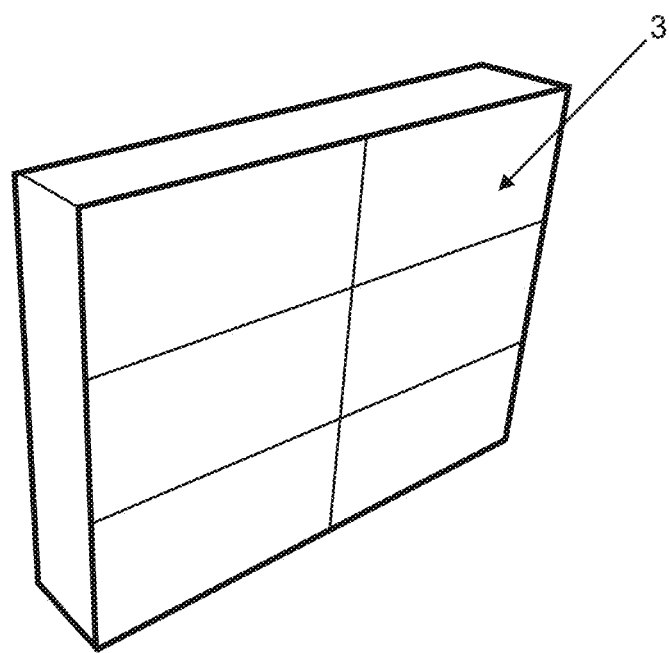
FIG. 16 shows a conventional view in perspective of a linear screen arrangements that are placed on the edges to appreciate their coupling rear characteristics of the modular multi-screen display.
Figure 17:
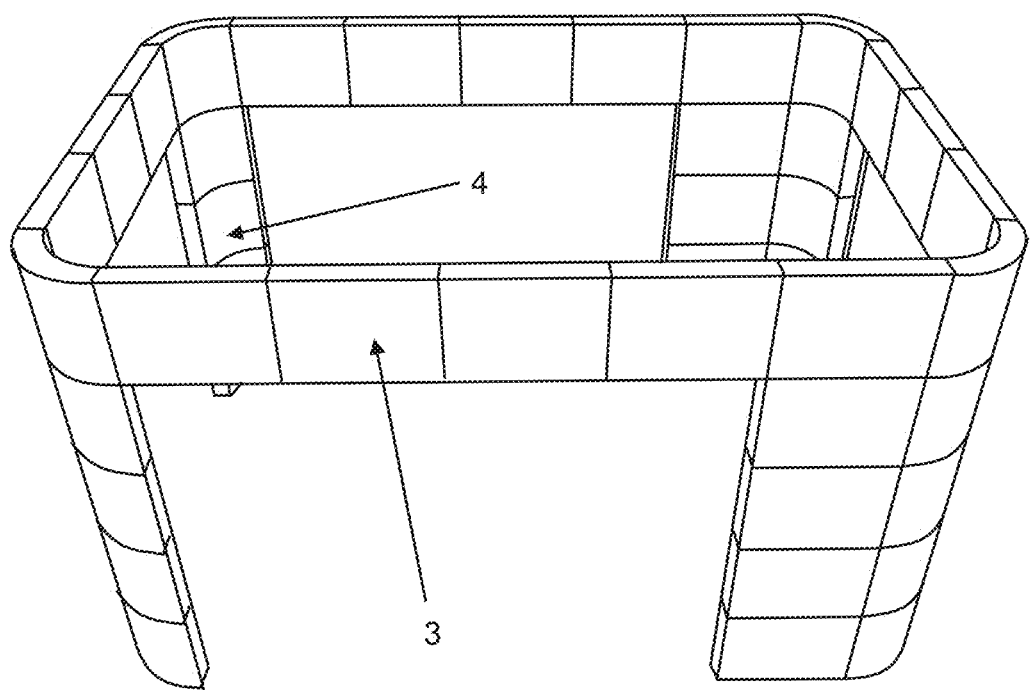
FIG. 17 shows an upper conventional view in perspective of a linear screen arrangement that are placed on the edges and the walls without the upper cylindrical section of the modular multi-screen display.
Figure 18:
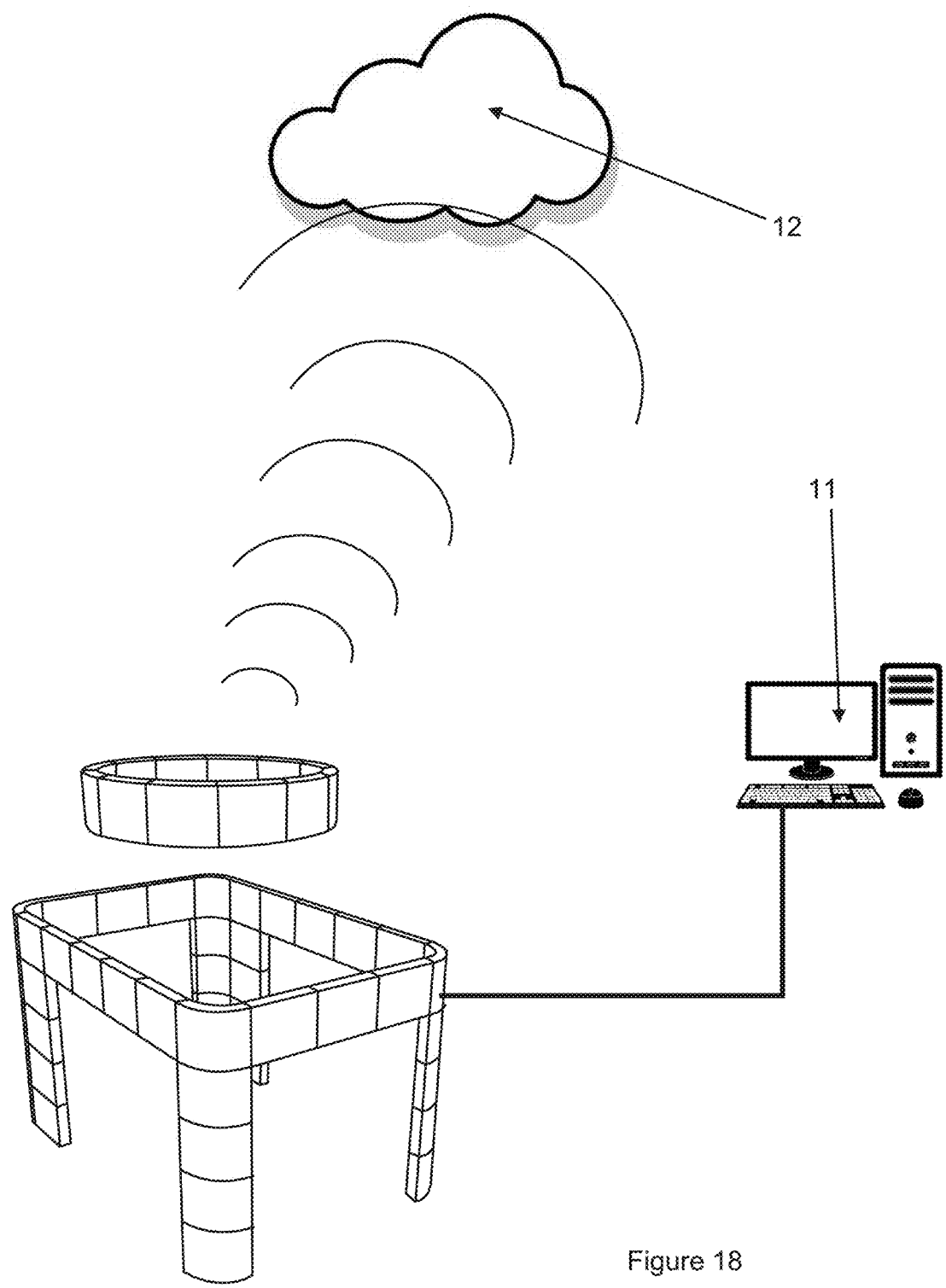
FIG. 18 shows a general view of the invention.

Based on the above mentioned figures the modular multi-screen display comprises one prismatic chassis 1 on each side face of the chassis 1 and using means of conventional fastening 2 (screws, pins, rivets, bolts, clamps, ties, latch or headbands) a multitude of flat screens is fastened 3 (at least two), which are interconnected to each other to provide a joint projection of images; said flat screens 3 at the corners that represent the chassis edges 1, holding also at least two curved screens 4, which allow to give to the projection of the side screens 3 the idea of continuity in their image, in order to provide stability to the screens 3 and 4, each one of them are place in a conventional support 5 where it rests on its base and also is fastened using the conventional fastening means; at least two curved screen 13 form a cylindrical section that is placed on the chassis 1 and manages to make joint projections with the screens 3 and 4 which are supported on the side faces and edges of the chassis 1; of each screen from the back of where the projection is made, at least one first pair of cables 6 is noticed with which it is connected with a second screen and a second pair of cables 7 where the first one makes possible to energize the screen by connecting it to a conventional power source and the second one is connected at least to a concentrator which in turn is connected to a PBC type card 9 and therefore this to a modem 10 that has a real time wireless connection, either by conventional wiring or by conventional wireless wiring (Wifi, Bluetooth, RFID); said modem signal is sent to a logical processing unit (physical 11 or virtual 12) that is responsible for hosting an algorithm, the projections displayed on the screens 3, 4 and 13; the screens 3 and 4 that are in the lower part and that come in contact with the ground has a stop 14 that prevents any user from hitting them.

A first variant consists in that the cylindrical section formed by screen 13, is replaced by flat screens 3 forming only one display line that is synchronized with the same projection that that of the multiplicity of screens in the display; this variant allows the display line to be placed not on the display, but on the outside the business, achieving a synchronization between the interior screens and the exterior screens of the premises, in such a way that the internal and external advertising of the premises shows a projection unit.

This display can form either an external chassis of a conventional refrigerator around which an advertising is displayed that extend over the upper screens of the same, its edges or all of its walls.

Invention Functioning

From the logical processing unit, which could be a conventional computer, an intelligent telephone, an electronic tablet, a PCB type card where the advertisements to be displayed on the display are stored or their variants, a digital signal is sent; this unit can be physical that is located in a space either within the same building where the display is located or virtual, that is to say, in the cloud which access is controlled by predefined keys and names. The processing unit sends by analogical or digital signals the information to be displayed in the display screens as if these were just one image in such a way that these are synchronized and between all of them they display an advertising unit from the cylindrical section that is on the display in one of the preferred embodiments to the external walls of the display; or well in other preferred embodiments from the screens placed outside of the building where the screen are placed to the display which are inside the building thanks to the fact that the modem receives the signal of the information that is projected on them. To exchange the information that is displayed, just modify the information on the logical processing unit and with it the displayed advertising changes immediately.

Some of the advantages of this technology are:
a) Avoids contamination of cardboard, paper, plastic that is exchanged in conventional displays.
b) updates promotions, articles, benefits, programs, advertisement, price labels, etc., in real time, etc.
c) efficiency in synchronization time of the promotions and prices, since it does not depend on human personnel to make a physical visit to exchange advertisement.
d) allows to present marketing schemes for short period of time, for example 10-minute promotions, 15, 1 hours, to support various product offers.
e) allows to make the communication channels efficient between the customers and providers of services or products.
f) As the display is modular, it adapts to spaces either by increasing or decreasing the number of screens that make up the display walls.

Having sufficiently described my invention which I consider as a novelty and therefore I claim my exclusive property the content in the following claims:

1. A modular multi-screen display comprising:
a prismatic chassis having a plurality of faces and corners having edges;
a flat screen located on each side face of the prismatic chassis;
fastening devices to secure the flat screen to the corresponding face;
the flat screens are interconnected to each other to provide a joint projection of images;
a curved screen located on the edges of the corners of the prismatic chassis, the curved screens give to the projection of the side screens an idea of continuity in their image;
each of the flat screen and the curved screens are placed in a support to rest on their bases;
wherein at least two of the curved screens form a cylindrical section that is placed on the prismatic chassis and makes the joint projections with the flat screens;
each screen from the back of where the projection is made, at least one first pair of cables is connected with a second screen and a second pair of cables where the first pair of cables energizes the screen by connecting to a conventional power source and the second pair of cables is connected at least to a concentrator which in turn is connected to a PBC type card, and therefore this to a modem which has a real time wireless connection; a modem signal is sent to a logical processing unit that is responsible for hosting an algorithm; the flat screens are located on a lower part, comes in contact with the ground and has a stop that prevents an user from hitting them.

2. The display in accordance with claim 1, wherein the cylindrical section formed by the flat screens is replaced by flat screens forming only one display line that is synchronized with the same projection of the multiplicity of screens in the display to allow the display line to be placed not on the display, but on the outside of the business, achieving a synchronization between the interior screens and the exterior screens of the premises, in such a way that the internal and external advertising of the premises shows a projection unit.

3. The display in accordance with claim 1, wherein the wireless connection is by WIFI, Bluetooth, or radio frequency identification (RFID).

4. The display in accordance with claim 1, wherein the logical processing unit is a physical unit or a virtual unit.

* * * * *